United States Patent
Liu et al.

(10) Patent No.: US 11,824,420 B2
(45) Date of Patent: Nov. 21, 2023

(54) BRUSHED MOTOR AND ELECTRICAL PRODUCT

(71) Applicant: NIDEC CORPORATION, Kyoto (JP)

(72) Inventors: Hui Liu, Liaoning (CN); Chao Li, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 25 days.

(21) Appl. No.: 17/706,603

(22) Filed: Mar. 29, 2022

(65) Prior Publication Data
US 2022/0320944 A1 Oct. 6, 2022

(30) Foreign Application Priority Data
Mar. 31, 2021 (CN) .......................... 202110346463.3

(51) Int. Cl.
*H02K 5/14* (2006.01)
*H01R 39/38* (2006.01)

(52) U.S. Cl.
CPC .............. *H02K 5/145* (2013.01); *H01R 39/38* (2013.01)

(58) Field of Classification Search
CPC .... H01R 39/38; H01R 39/385; H01R 39/386; H01R 39/388; H01R 39/39; H02K 5/14; H02K 5/143; H02K 5/145; H02K 5/146; H02K 5/148; H02K 23/00
USPC ........................................................ 310/239
See application file for complete search history.

(56) References Cited

U.S. PATENT DOCUMENTS

| | | | |
|---|---|---|---|
| 6,803,687 B2 | 10/2004 | Murakami et al. | |
| 2006/0267446 A1* | 11/2006 | Hirabayashi | H02K 13/10 310/248 |
| 2010/0164333 A1* | 7/2010 | Uchimura | H02K 11/215 310/68 B |
| 2013/0264900 A1* | 10/2013 | Ichihara | H01R 39/36 310/249 |
| 2015/0130329 A1* | 5/2015 | Kawashima | H02K 1/265 310/68 C |
| 2022/0320944 A1* | 10/2022 | Liu | H02K 5/145 |

* cited by examiner

*Primary Examiner* — Ahmed Elnakib
(74) *Attorney, Agent, or Firm* — JCIPRNET

(57) ABSTRACT

A brushed motor includes a shaft, an armature around the shaft, a commutator on one side of the armature in an axial direction, a brush card on one side of the commutator in the axial direction, and a housing accommodating a portion of the shaft, the armature, the commutator, and a portion of the brush card. A convex portion positions corresponding to the commutator in the axial direction on a surface of the brush card on one side facing the commutator, which has a main body portion around the shaft and a pin bent from an end of the main body portion on the other side in the axial direction toward an outer side in a radial direction and one side in the axial direction. A distance between the pin and a brush on the brush card is larger than that between the main body portion and the convex portion.

6 Claims, 2 Drawing Sheets

BRUSHED MOTOR AND ELECTRICAL PRODUCT

CROSS REFERENCE TO RELATED APPLICATIONS

The present invention claims priority under 35 U.S.C. § 119 to Chinese Application No. 202110346463.3 filed on Mar. 31, 2021 the entire content of which is incorporated herein by reference.

FIELD OF THE INVENTION

An example of the present application relates to the mechanical and electrical field, and particularly to a brushed motor and an electrical product.

BACKGROUND

A brushed motor is a rotary motor that includes a brush device inside and either converts electrical energy into mechanical energy (an electric motor) or converts mechanical energy into electrical energy (a generator). During operation of the brushed motor, a coil and a commutator rotate, a tile magnet and a brush do not rotate, and an alternating change in a current direction of the coil is carried out by the commutator which rotates with the motor and the brush.

It should be noted that the above description of the technical background only describes the technical solution of the present application clearly and thoroughly and facilitates the understanding of those skilled in the art. The above technical solution should not be considered known to those skilled in the art solely because these solutions are described in the related art part of the present application.

The inventors have found that in a conventional structure, when the motor is overturned and inverted, the rattling of an armature causes the collision of a wiring pin of the commutator to an electronic component such as the brush or the like, which leads to the destruction of the brush and an internal structure and affects the performance of the motor.

SUMMARY

One aspect of the example of the present application provides a brushed motor, including: a shaft, an armature arranged around the shaft, a commutator located on one side of the armature in an axial direction, a brush card located on one side of the commutator in the axial direction, and a tubular housing that accommodates a portion of the shaft, the armature, the commutator, and a portion of the brush card, wherein
  a convex portion is arranged at a position corresponding to the commutator in the axial direction on a surface of the brush card on one side facing the commutator;
  the commutator has a main body portion arranged around the shaft and a pin bent from an end of the main body portion on the other side in the axial direction toward an outer side in a radial direction and one side in the axial direction; and
  a distance between the pin and a brush arranged on the brush card is larger than a distance between the main body portion and the convex portion.

Another aspect of the example of the present application provides an electrical product having the brushed motor according to any one of the above examples.

The above and other elements, features, steps, characteristics and advantages of the present disclosure will become more apparent from the following detailed description of the preferred embodiments with reference to the attached drawings.

BRIEF DESCRIPTION OF THE DRAWINGS

The appended drawings are used to provide a further understanding on an example of the present application, and are used to constitute a part of the specification, illustrate an exemplary embodiment of the present application, and explain the principles of the present application along with text description. Obviously, the drawings in the following description are only some examples of the present application, and those skilled in the art may obtain other drawings based on these drawings even without creative labor. In the drawings.

DETAILED DESCRIPTION

Figure 1:
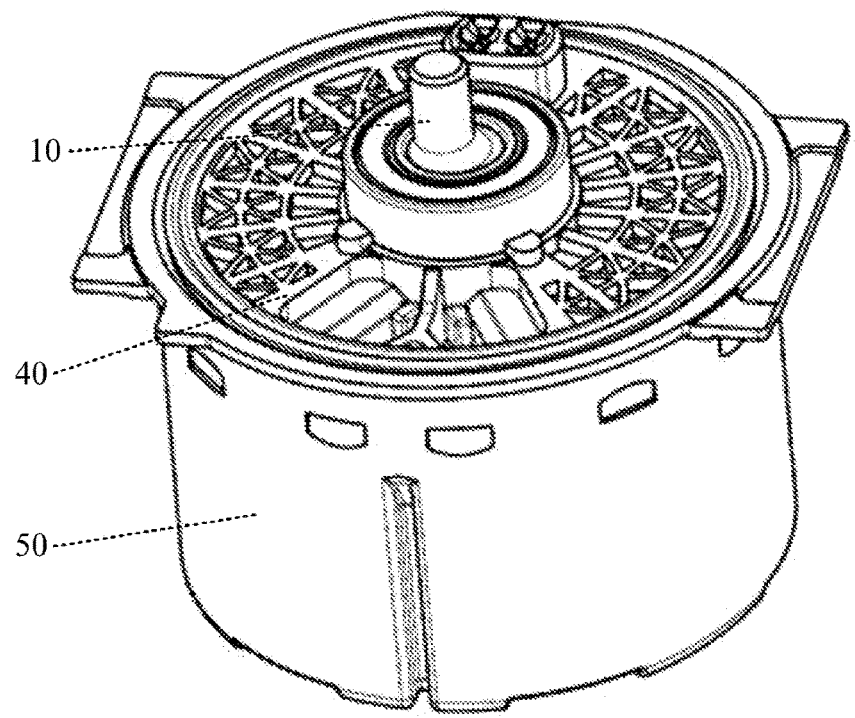
FIG. 1 is a schematic diagram of an example of a brushed motor according to an example of the present application.

With reference to the drawings, the above-described features and other features of the present application are clarified by the following specification. An exemplary embodiment of the present application, which represents some exemplary embodiments in which the principles of the present application may be adopted, is specifically disclosed in the specification and drawings. It should be understood that the present application is not limited to the described exemplary embodiment, and the present application includes all modifications, variations, and equivalents that fall within the scope of the attached claims.

In the example of the present application, the expression "and/or" includes any one or all combinations of one type or plural types of terms listed in connection therewith. The expression such as "contain" "include" "have" and the like refer to the existence of the stated feature, element, component part, or assembly, but do not exclude the presence or addition of one or a plurality of other features, elements, component parts, or assemblies.

In the example of the present application, the singular form such as "one", "this" or the like may include the plural form. For example, "one kind of" or "one type of" should be broadly understood and is not limited to the meaning of "one". In addition, the expression "the . . . mentioned above" should be understood to include both the singular form and the plural form unless otherwise specified before and after. Also, the expression "according to" should be understood as "at least partially . . . according to" and the expression "based on" should be understood as "at least partially . . . based on" unless otherwise stated before and after.

Note that, in the following description of the present application, for convenience of description, a direction extending along a central axis O of a motor or a direction parallel to the central axis O is referred to as "axial direction"; a direction oriented to an opening of a motor housing from the bottom of the motor housing is referred to as "above", "upper side", "upper side in the axial direction" or "one side in the axial direction"; a direction oriented to the bottom of the motor housing from the opening of the motor housing is referred to as "below", "lower side", "lower side in the axial direction" or "the other side in the axial direction"; a radius direction centered on the central axis O is referred to as "radial direction"; a direction of getting close to the central axis O is referred to as "inner side in the radial direction"; a direction of getting away from the central axis O is referred to as "outer side in the radial direction"; and a direction surrounding the central axis O is referred to as "circumferential direction". However, it is worth noting that these are used only for convenience of description and do not limit the orientation of the motor during use and manufacture.

Hereinafter, the embodiment of the example of the present application is described with reference to the drawings.

The example of the present application provides a brushed motor.

Figure 2:
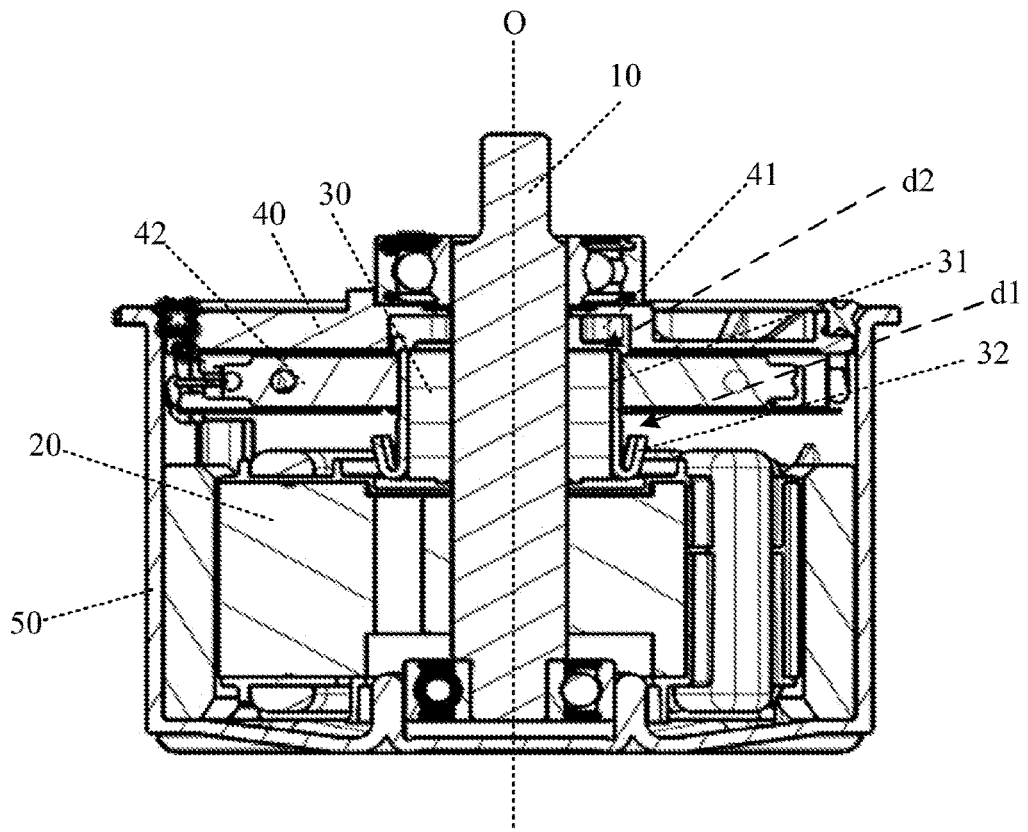
FIG. 2 is a schematic diagram of an axial cross section of the brushed motor shown in FIG. 1.

FIG. 1 is a schematic diagram of an example of the brushed motor according to the example of the present application, and FIG. 2 is a schematic diagram of an axial cross section of the brushed motor shown in FIG. 1. As shown in FIGS. 1 and 2, the brushed motor includes: a shaft 10, an armature 20 arranged around the shaft 10, a commutator 30 located on one side of the armature 20 in an axial direction, a brush card 40 located on one side of the commutator 30 in the axial direction, and a tubular or substantially tubular housing 50 that accommodates a portion of the shaft 10, the armature 20, the commutator 30, and a portion of the brush card 40.

The above description is only a description of the structure of the brushed motor with examples, the brushed motor may further include other normal assemblies such as a bearing, a bearing holding member, and the like, and related techniques may be specifically referred to.

In the example of the present application, as shown in FIG. 2, a convex portion 41 is arranged at a position corresponding to the commutator 30 in the axial direction on a surface of the brush card 40 on one side facing the commutator 30. The commutator 30 has a main body portion 31 arranged around the shaft 10 and a pin 32 bent from an end of the main body portion 31 on the other side in the axial direction (a lower side in the axial direction shown in FIG. 2) toward the outer side in the radial direction and one side in the axial direction. A distance d1 between the pin 32 and a brush 42 arranged on the brush card 40 is larger than a distance d2 between the main body portion 31 and the convex portion 41.

Accordingly, by adding the convex portion on the brush card, the commutator and the convex portion are configured to come into contact with each other first when the armature is pulled upwards, thereby preventing a collision between the pin of the commutator and the brush and preventing the damage to the brush.

In some examples, the commutator 30 and the convex portion 41 are not in contact with each other when the armature 20 is not subjected to an axial tensile force.

In some examples, the convex portion 41 and the brush card 40 are integrally molded, which makes it easy to mold and saves man-hours. However, the present application is not limited thereto, the convex portion 41 may be fixed to the brush card 40 after the brush card 40 is molded, and the present application does not limit a fixing method thereof. Thereby, a conventional structure of the brush card 40 is not affected, a mold for molding the brush card 40 is not required to be changed, and the cost is saved.

In some examples, the number of the convex portion 41 is at least three, and these convex portions 41 are arranged at equal intervals along the circumferential direction. Thereby, when the commutator 30 and the convex portion 41 come into contact with each other, an effect of equilibrium support is realized by the three or more convex portions 41.

Figure 3:
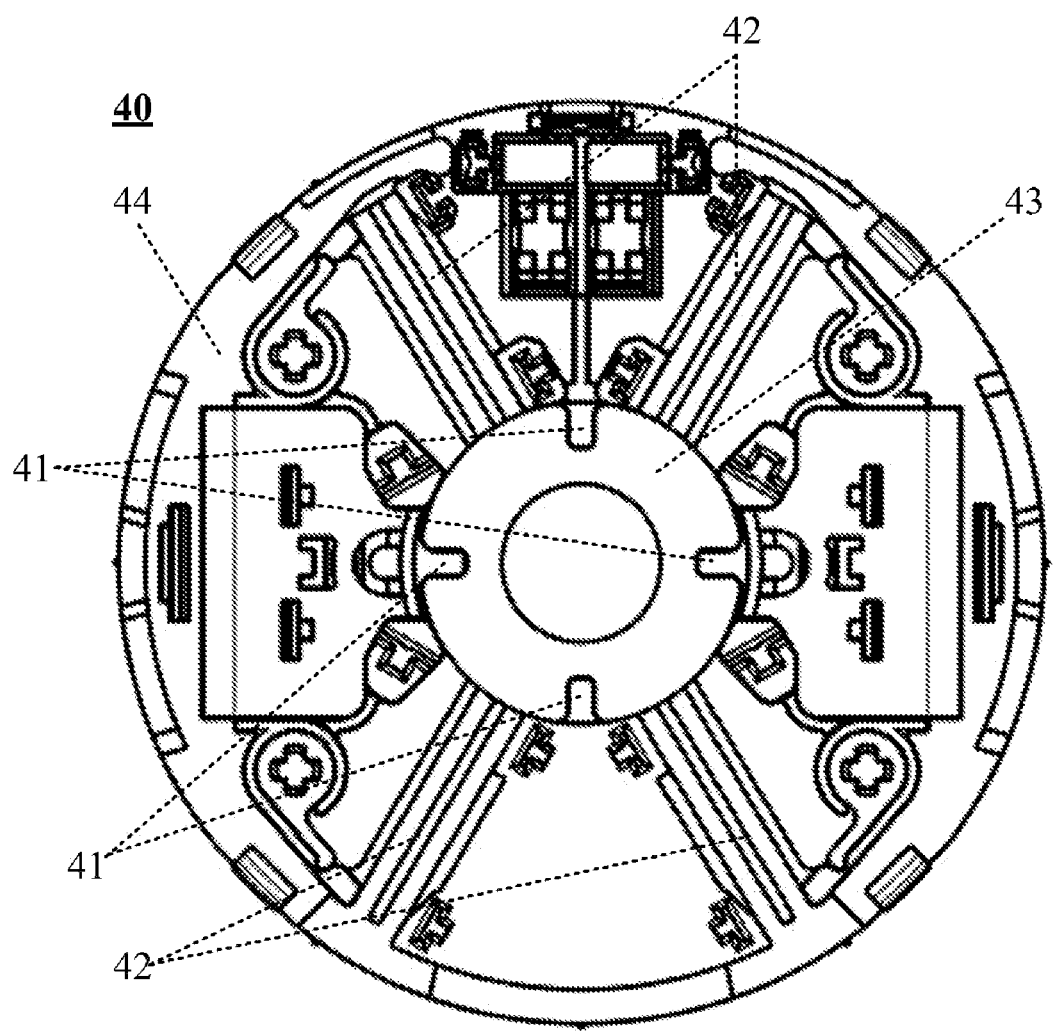
FIG. 3 is a schematic diagram of an example of a brush card of the brushed motor according to the example of the present application.

FIG. 3 is a schematic diagram of an example of the brush card 40 of the brushed motor according to the example of the present application, and shows a situation in which the brush card 40 is viewed from the lower side in the axial direction to the upper side in the axial direction.

As shown in FIG. 3, in some examples, the brush card 40 has a first annular portion 43 arranged around the shaft 10 and extending along a direction perpendicular to the axial direction, and a second annular portion 44 located on an outer periphery of the first annular portion 43 and extending along a direction perpendicular to the axial direction. The convex portion 41 is arranged on a surface of the first annular portion 43 on one side facing the commutator 30, and a plurality of brushes 42 are arranged on one side of the second annular portion 44 facing the commutator 30.

Thereby, the installation of the convex portion 41 does not cause interference with other members on the brush card 40.

In the example of FIG. 3, a case in which the number of the convex portion 41 is four is taken as an example, but the present application is not limited thereto, and if necessary, a larger number of convex portions 41 may be arranged or three convex portions 41 may be arranged.

In the example of FIG. 3, a case in which the number of the brush 42 is four is taken as an example, but the present application is not limited thereto. As for the number of the brush 42 and the installation method of the brush 42, related techniques may be referred to, and the description thereof is omitted here. Moreover, in addition to the brush 42, other members may be further arranged on the brush card 40, and as for the specific contents, related techniques may be referred to, and the description thereof is omitted here.

In some examples, as shown in FIG. 3, the convex portion 41 extends along the radial direction, and an end of the convex portion 41 on the inner side in the radial direction and the shaft 10 are separated by a certain distance. Thereby, an installation space of the convex portion 41 is secured, and the interference between the convex portion 41 and the shaft 10 is avoided.

It is worth noting that the above description is only an exemplary description of the configuration of the brushed motor related to the present application, the present application is not limited thereto, and appropriate variations may be made based on each of the above examples. In addition, the above description is only an exemplary description of each member, the present application is not limited thereto, and related techniques may be referred to for the specific contents of each member. In addition, members not shown in FIGS. 1 to 3 may be added, or one or a plurality of members in FIGS. 1 to 3 may be reduced. As for other configurations and structures of the brushed motor, related techniques may be referred to, and the description is omitted herein.

According to the example of the present application, by adding the convex portion on the brush card, the commutator and the convex portion are configured to come into contact with each other first when the armature is pulled upwards, thereby preventing a collision between the pin of the commutator and the brush and preventing the damage to the brush.

An example of the present application provides an electrical product having the brushed motor described in the example of the first aspect. The structure of the brushed motor has already been described in detail in the example of the first aspect, the contents thereof are incorporated here, and thus the description thereof is omitted here.

In the example of the present application, the electrical product may be any electrical equipment in which a brushed motor is installed. For example, the electrical product may be a household electrical appliance such as an indoor unit of an air conditioner, an outdoor unit of an air conditioner, a water supply machine, a washing machine, a vacuum cleaner, a compressor, a blower, and a mixer, may be industrial equipment such as a pump, a conveyor, an elevator, a standard industrial general-purpose mounter, a wind generator, a grinder, a traction motor, or various information processing equipment, and may be each member of an automobile such as an electric power steering system of an automobile, a sunroof adjusting member of an automobile, a seat adjusting member, a transmission, and a brake device.

Although the present application has been described above in association with the exemplary embodiment, those skilled in the art should understand that these descriptions are all exemplary and are not restrictions on the scope of protection of the present application. Those skilled in the art may make various variations and modifications to the present application based on the gist and principle of the present application, and these variations and modifications are also within the scope of the present application.

The exemplary embodiments of the present application have been described above with reference to the drawings. Many features and advantages of these exemplary embodiments are obvious according to the detailed specification. Therefore, the attached claims are to cover all those features and advantages of these exemplary embodiments that fall within the true gist and scope. Moreover, because those skilled in the art are able to easily conceive of many modifications and changes, the exemplary embodiments of the present application are not limited to the precise structures and operations as illustrated and described, and encompass all suitable modifications and equivalents that fall within the scope thereof.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A brushed motor, comprising: a shaft, an armature arranged around the shaft, a commutator located on one side of the armature in an axial direction, a brush card located on one side of the commutator in the axial direction, and a tubular housing that accommodates a portion of the shaft, the armature, the commutator, and a portion of the brush card, wherein
    a convex portion is arranged at a position corresponding to the commutator in the axial direction on a surface of the brush card on one side facing the commutator;
    the commutator has a main body portion arranged around the shaft and a pin bent from an end of the main body portion on the other side in the axial direction toward an outer side in a radial direction and one side in the axial direction; and
    a distance between the pin and a brush arranged on the brush card is larger than a distance between the main body portion and the convex portion;
    wherein the number of the convex portions is at least three, and the convex portions are arranged at equal intervals along a circumferential direction.

2. The brushed motor according to claim 1, wherein the convex portion and the brush card are integrally molded.

3. The brushed motor according to claim 1, wherein the commutator and the convex portion are not in contact with each other when the armature is not subjected to an axial tensile force.

4. The brushed motor according to claim 1, wherein the brush card has a first annular portion arranged around the shaft and extending along a direction perpendicular to the axial direction, and a second annular portion located on an outer periphery of the first annular portion and extending along a direction perpendicular to the axial direction; the convex portion is arranged on a surface of the first annular portion on one side facing the commutator; and a plurality of the brushes are arranged on one side of the second annular portion facing the commutator.

5. The brushed motor according to claim 4, wherein the convex portion extends along the radial direction, and an end of the convex portion on an inner side in the radial direction and the shaft are separated by a certain distance.

6. An electrical product, comprising the brushed motor according to claim 1.

* * * * *